(12) United States Patent
Van De Witte et al.

(10) Patent No.: US 6,674,505 B1
(45) Date of Patent: Jan. 6, 2004

(54) LIGHT-MODULATING CELL

(75) Inventors: Peter Van De Witte, Eindhoven (NL); Rifat Ata Mustafa Hikmet, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/433,259

(22) Filed: Nov. 4, 1999

(30) Foreign Application Priority Data

Nov. 4, 1998 (EP) .............................................. 98203721

(51) Int. Cl.⁷ .............................................. C09K 19/02
(52) U.S. Cl. ........................ 349/172; 349/175; 349/176
(58) Field of Search ............................ 349/172, 96, 98, 349/175, 176, 97

(56) References Cited

U.S. PATENT DOCUMENTS

| 5,453,863 | A |   | 9/1995 | West et al. ................... 359/91 |
| 5,796,454 | A |   | 8/1998 | Ma .............................. 349/98 |
| 6,034,752 | A | * | 3/2000 | Khan et al. ................... 349/74 |
| 6,366,330 | B1 | * | 4/2002 | Khan et al. ................... 349/35 |
| 6,377,321 | B1 | * | 4/2002 | Khan et al. ................... 349/35 |

* cited by examiner

*Primary Examiner*—James Dudek
*Assistant Examiner*—David Chung
(74) *Attorney, Agent, or Firm*—Aaron Waxler

(57) ABSTRACT

A light-modulating cell and a display device based on a chiral nematic liquid crystal material in which the difference of optical rotation power between the planar nematic state and the focal conic state is used for discriminating between optical states, in particular for chiral nematic liquid crystal material having a pitch length associated with infrared light.

20 Claims, 3 Drawing Sheets

LIGHT-MODULATING CELL

BACKGROUND OF THE INVENTION

The invention relates to a light-modulating cell comprising two substrates with a layer of electro-optical material in between, comprising a chiral nematic liquid crystal material which, in co-operation with the substrates, can assume a plurality of states, of which at least a focal conic state and a twisted planar state are stable in the absence of an electric field, said light-modulating cell being also provided with drive means for applying an electric field.

A light-modulating cell based on two (or more) stable states may be used in various applications, for example, in display devices where information written once should be maintained for a longer period (electronic newspapers, telephony, smart cards, electronic price tags, personal digit assistants, billboards, etc.), but also in known display application ns (instrument panels, monitors, television, etc.) or as an electronic shutter.

The invention also relates to a display device provided with such a light-modulating cell.

A light-modulating cell of the type described in the opening paragraph is disclosed in U.S. Pat. No. 5,453,863. The light-modulating cell described in this patent has a plurality of stable states, namely light-scattering states, which correspond to the focal conic state of a layer of liquid crystal material, and a reflecting state which corresponds to the twisted planar state of the layer of the liquid crystal material. In the light-scattering states, the light is scattered to a greater or lesser extent, dependent on the grey level. In the twisted planar state, the liquid crystal molecules are located substantially parallel to the substrates in the form of a helix structure with a pitch P (the axis of the helix is perpendicular to the substrates). In the focal conic state, the helix structure is interrupted, but groups of molecules still have helix structures, preferably with the axes of the helices being mainly parallel to the substrates, but these may also be located at different angles.

For a satisfactory light scattering in the light-scattering state, the light-modulating cell should be sufficiently turbid. This means that with admixtures, or the light-modulating cell must have a sufficient thickness. The latter means that the electric voltages to be used for switching become considerably higher, certainly too high for a number of said (portable) applications. Moreover, the switching time increases with an increasing thickness of the light-modulating cell.

OBJECTS AND SUMMARY OF THE INVENTION

It is an object of the present invention to obviate one or more of said drawbacks as much as possible. To this end, a light-modulating cell according to the invention is characterized in that the optical rotation of the layer of electro-optical material in the focal conic state and in the twisted planar state has different values, and the light-modulating cell comprises means for enabling detection of the difference of optical rotation.

The difference of optical rotation is preferably at least 20 degrees.

A further preferred embodiment is characterized in that the layer of electro-optical material is substantially transparent in the focal coni state, and a polarizer is present on at least one of the two sides of the light-modulating cell.

"Substantially transparent" is understood to mean that light which is incident on the light-modulating cell is mainly scattered in the forward direction and reflected as little as possible. At least 25% and preferably 50% of the beam of incident light is passed.

The invention is based on the recognition that optical rotation takes place outside the optical band where reflection predominantly occurs in a chiral nematic or cholesteric layer of liquid crystal material, notably in the twisted planar state. In the focal conic state, this rotation is relatively small so that discrimination between two polarizers (in transmission) is possible between a substantially (light-)transmissive state and a substantially (light) non-transmissive state. In practice, switching takes place between two states each having a different optical rotation.

In order that reflections of ambient light have no detrimental effect, the twisted planar structure has such a pitch length that light outside the visible spectrum is reflected. Preferably, use is made of reflection in the infrared range (wavelengths between 700 and 3000 nm and preferably between 700 and 1500 nm) because it has been found that the switching voltage decreases with an increasing pitch.

A preferred embodiment of a light-modulating cell according to the invention is characterized in that the light-modulating cell is present between two polarizers whose directions of polarization have a mutual angle of between 30 and 140 degrees, preferably approximately 90 degrees. In this case, the contrast is optimal.

These and other aspects of the invention are apparent from and will be elucidated, by way of non-limitative example, with reference to the embodiments described hereinafter.

The drawings are not to scale and are shown diagrammatically.

DESCRIPTION OF THE PREFERRED EMBODIMENTS

Figure 1:
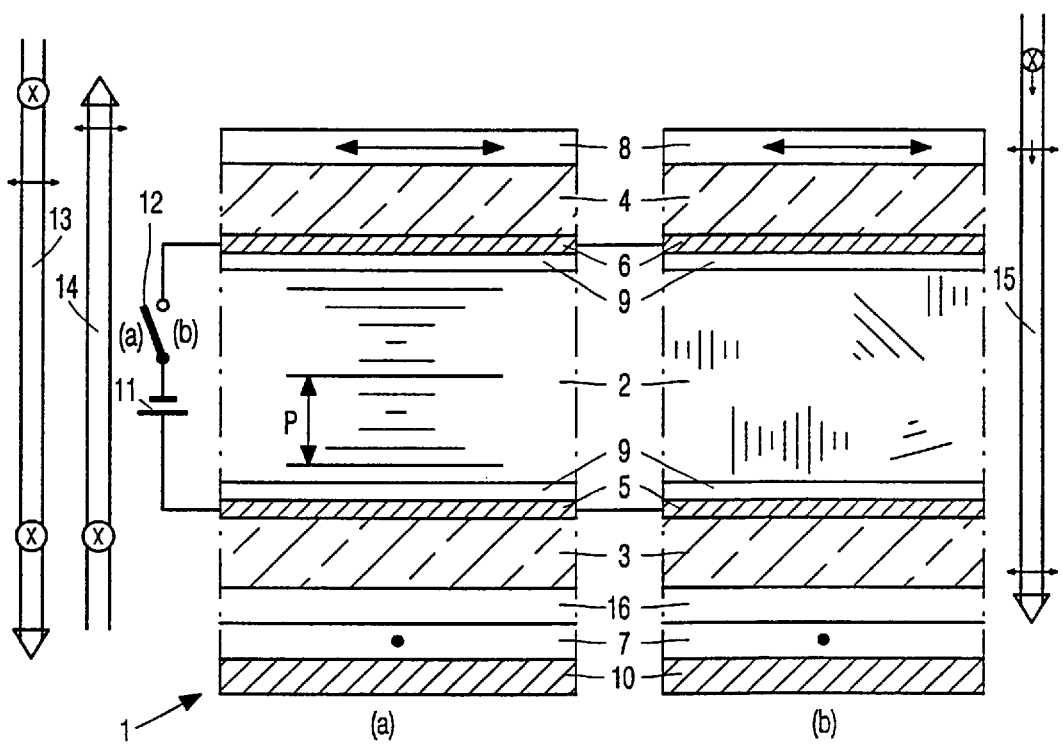
FIG. 1 is a diagrammatic cross-section of a light-modulating cell according to the invention, in two different states.

FIG. 1 is a diagrammatic cross-section of a part of a light-modulating cell 1 which a chiral nematic liquid crystal material 2 present between two substrates 3, 4 of, for example, glass or plastic, provided with electrodes 5, 6. The device further comprises two polarizers 7, 8 whose direction of polarization is mutually crossed perpendicularly in this embodiment. If necessary, the device comprises orientation layers 9 orienting the liquid crystal material on the inner walls of the substrates. In this case, the liquid crystal material has a positive optical anisotropy and a positive dielectric anisotropy. In the embodiment of FIG. 1, the light-modulating cell is made reflective by means of a reflector 10.

The chiral nematic liquid crystal material 2 is a mixture of a nematic liquid crystal material having a positive dielectric anisotropy and chiral material which is present in such a quantity that a planar nematic or cholesteric structure is obtained with a given pitch length P; this pitch length P is the distance through which the directors of the liquid crystal material undergo a rotation of 360 degrees. The liquid crystal molecules are oriented more or less parallel to a wall of the substrate, so that a first stable state is obtained, with a helix structure having a pitch length P (FIG. 1$^a$). The thickness d of the light-modulating cell is several times the pitch length P (for example 6 times but at least twice).

Another stable state which such a chiral nematic liquid crystal material can assume is the focal conic state (FIG. 1$^b$) if the electrodes 5, 6 are energized with an electric voltage (represented by means of a voltage source 11 and a switch 12 in FIG. 1). The helix structure is, as it were, broken up into pieces which are arbitrarily oriented and on which light is scattered. After the electric field has been removed, this state remains. A third state is the homeotropic state. Switching between different states occurs in a way generally known in the art. To this end the device is provided with the necessary drive means, for applying an electric field.

The planar nematic state has the property that it reflects light at a wavelength in a band around $\lambda$=n.P (n: average refractive index). According to the invention, the pitch length of the chiral nematic material is chosen to be such that the layer of electro-optical (chiral nematic) material has a given transparency in the focal conic state, and a polarizer is present on at least one of the two sides of the light-modulating cell.

Figure 2:
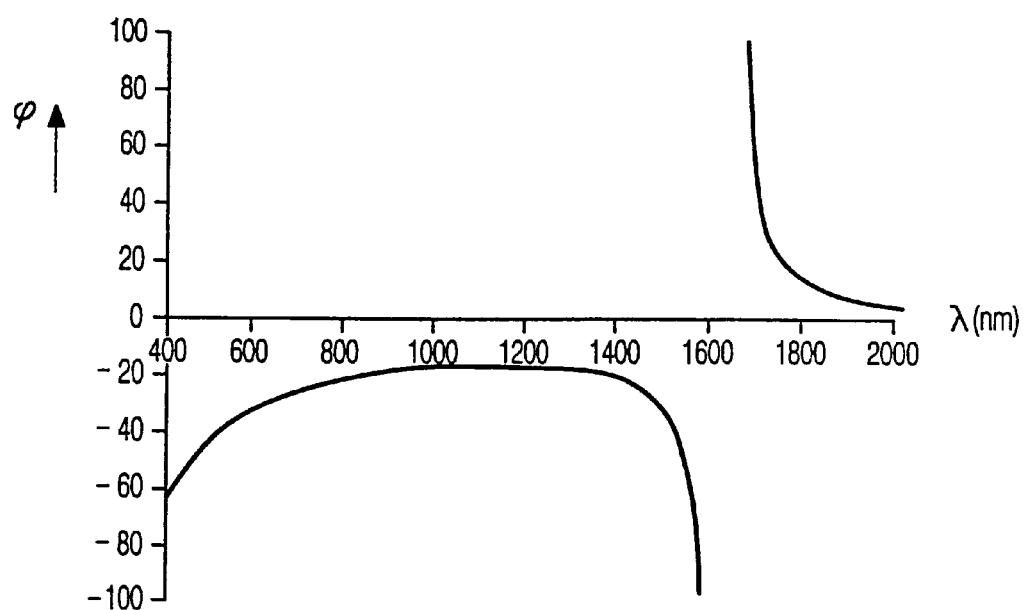
FIGS. 2 and 3 show a typical variation of the optical rotation of such a light-modulating cell for the cholesteric or twisted planar state.
Figure 3:
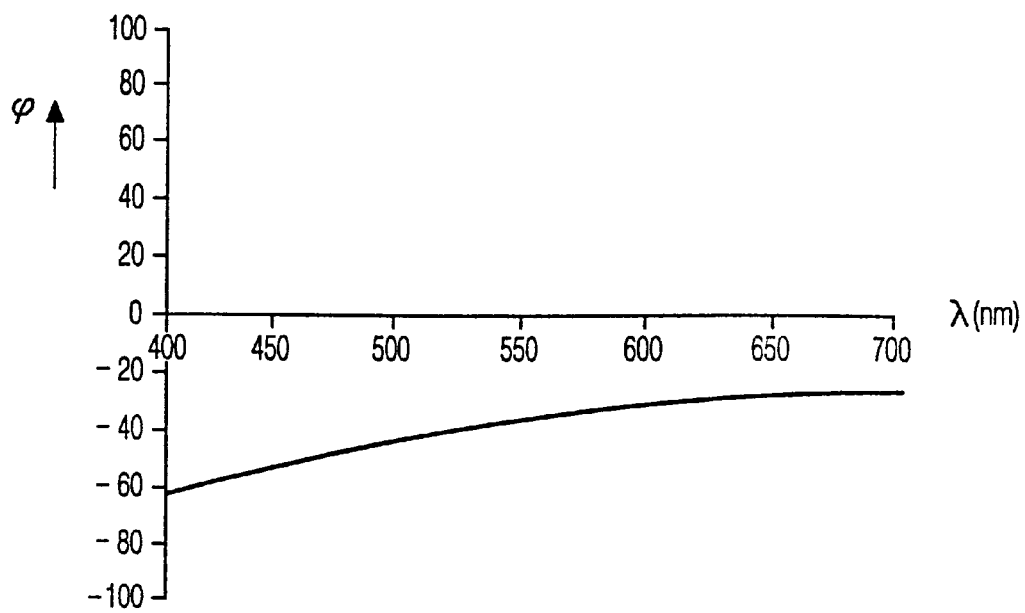

In the device of FIG. 1, such a liquid is chosen that the twisted planar structure has such a pitch length that light outside the visible spectrum is substantially completely reflected. The pitch length in this example is 1 $\mu$m, while $n_o$=1.528 and $n_e$=1.75 for the refractive indices. The wavelength at which maximal reflection occurs then is $\lambda_o$=P.($n_e$+$n_o$)/2, or approximately 1640 nm. This wavelength is in the infrared range. When used in a display device, such a light-modulating cell will thus not reflect in the visible part of the spectrum. Light in the light-modulating cell does undergo a certain optical rotation, both when used in transmission and when used in reflection. This is shown with reference to FIG. 2 and FIG. 3 which show the (calculated) optical rotation for this light-modulating cell as a function of the wavelength. FIG. 3 is a detail of FIG. 2, accentuating the visible part of the spectrum. The curve in FIG. 3 corresponds to measuring results. For the twisted planar structure it holds approximately for the optical rotation $\alpha$ (at pitch lengths corresponding to reflection in the infrared range):

$$\alpha = -45.(\Delta n)^2.d.P/(\lambda)^2, \Delta n = n_e - n_o$$

Figure 4:
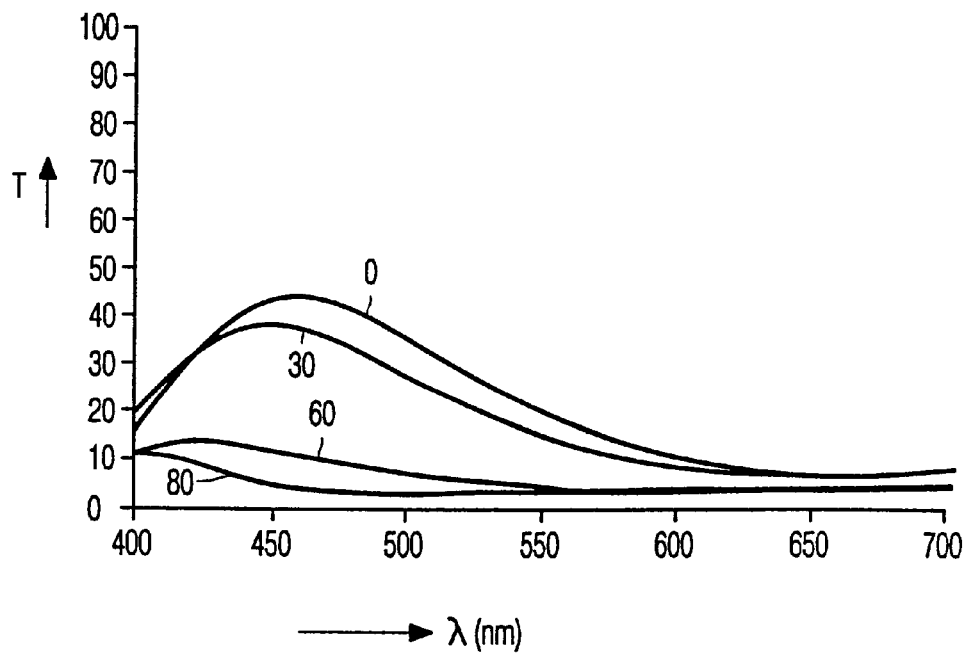
FIGS. 4 and 5 show the optical rotation of a light-modulating cell for the cholesteric and the focal conic state.
Figure 5:
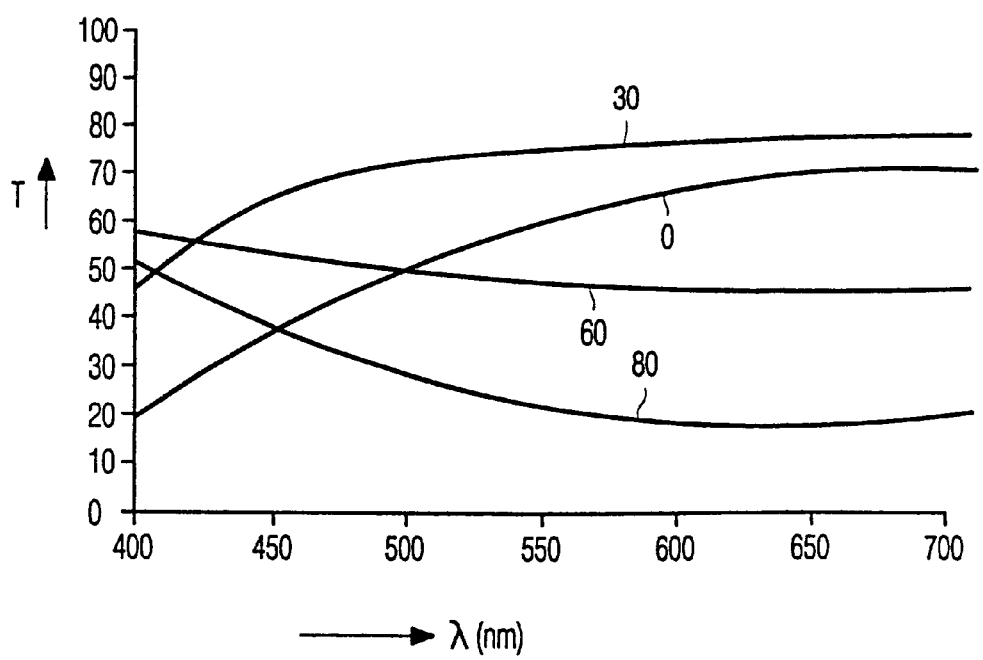

For the focal conic structure it holds that it has much less optical rotation. The difference between the two states as regards optical rotation is illustrated with reference to FIGS. 4 and 5. FIG. 4 shows the transmission of a light-modulating cell in the focal conic structure with a thickness of 4.3 $\mu$m for different values of the angle between the directions of polarization of the polarizers 7, 8 (one of the polarizers has a direction of polarization parallel to the direction of orientation of the most proximate orientation layer). FIG. 5 shows the transmission of the same cell in the planar nematic state, at the same angles between the polarizers. For the measurements, use is made of a very narrow viewing angle so that substantially only perpendicularly exiting light was measured. In practice, the contrast appears to be lower due to diffuse light. An 1:1 mixture of BL87 and BL88 of the firm of Merck was used as a liquid crystal material. The associated pitch length was about 1 $\mu$m. The Figures (and other measurements, also in diffuse light) show that a contrast of 1:3 or more for the entire visible wavelength range was realized, notably at larger angles between the directions of polarization of the polarizers 7, 8 (>50 degrees). Different values were found for other mixtures.

When such a light-modulating cell is used in a display device, the picture quality can be improved by means of compensation foils or optical retarders. An optical retarder between the liquid crystal layer and the polarizer may be placed, for example, in such a way that the difference of angle rotation is increased.

In the embodiment of FIG. 1, the light-modulating cell comprises a reflector 10 and (in this embodiment) a retarder 16. Incident light 13 is polarized by the polarizer 8, whereafter the polarized light is rotated through an angle $\alpha$ in the planar nematic or cholesteric structure, at which $\alpha$ may vary between 50 and 130 degrees but is 60 degrees in the relevant embodiment. Since the angle between the directions of polarization of the polarizers 7, 8 is also about 60 degrees in this embodiment, the polarized light is passed by the polarizer 7, reflected on the reflector 10 and again passed by the polarizer 7. The reflected, polarized light 14 again undergoes a rotation through an angle $\alpha$, but now in the opposite direction, so that it is passed by the polarizer 8 (situation (a) in FIG. 1).

In the focal conic structure (situation (b) in FIG. 1), the polarized light 15 hardly undergoes any rotation and is substantially completely absorbed by the polarizer 7.

At a high voltage across the light-modulating cell, the liquid crystal material assumes a third stable state, referred to as the homeotropic state, i.e. all molecules orient themselves to the field and the light-modulating cell is transparent at all (visible) wavelengths. Dependent on the drive voltage and the switching rate, the light-modulating cell switches from this state to the planar nematic or the focal conic state. Table 1 shows the pitch P and the voltage required to switch from the planar nematic state to the focal conic state ($V_1$) and from the planar nematic state to the homeotropic state ($V_2$) and from the focal conic state to the homeotropic state ($V_3$) for different mixtures of BL87 and BL88 of the firm of Merck and at different cell thicknesses d.

TABLE 1

| d($\mu$m) | ratio BL87/BL88 | Pitch P($\mu$m) | $V_1$(V) | $V_2$(V) | $V_3$(V) |
|---|---|---|---|---|---|
| 4.2 | 45/55 | 613 | 13 | 24 | 11 |
| 6.5 | 45/55 | 613 | 17 | 32 | 15 |
| 4.3 | 53/47 | 736 | 10.5 | 20 | 9.5 |
| 6.5 | 53/47 | 736 | 15 | 27 | 12 |
| 4.3 | 62/38 | 920 | 8.5 | 17.5 | 9 |
| 6.5 | 62/38 | 920 | 12 | 23 | 11 |
| 4.4 | 75/25 | 1500 | 7 | 15 | 8 |
| 6.5 | 75/25 | 1500 | 7.5 | 16.5 | 9 |
| 4.2 | 80/20 | 2000 | 5 | 11 | 6 |
| 6.4 | 80/20 | 2000 | 5 | 13 | 8 |

It is apparent from the Table that switching takes place at low voltages, notably at a small cell thickness. The small cell thickness is possible in a light-modulating cell according to the invention because the light-modulating cell is substantially transparent in the focal conic state and the invention makes use of the difference between optical rotation power between the planar nematic state and the focal conic state of the liquid crystal material. If necessary, the switching rate is increased by providing polymeric networks.

It will be evident that the invention is not limited to the embodiments shown. For example, the reflector 10 may be replaced by a transflector. If necessary, the polarizer 7 may be dispensed with. The directions of polarization of the polarizers 7, 8 may also be chosen to be parallel to each other; in that case, the situation (a) in FIG. 1 is light-absorbing and situation (b) is light-transmissive. For color display in a picture display device, the light-modulating cell is provided, if necessary, with reflecting or absorbing color filters.

Moreover, it has been found that there is a difference of optical rotation between the planar nematic state and the focal conic state, also at other reflection wavelengths (in the visible part of the spectrum, for example, at wavelengths from 500 nm). For example, at a pitch P, which causes reflection of green light, optical rotation will occur for blue (and/or red light, while in the focal conic state there will be no optical rotation (in this state, substantially no green light is reflected either). Discrimination with polarizers then again takes place between the two states.

In summary, the invention relates to a light-modulating cell and a display device based on a chiral nematic liquid crystal material in which the difference of optical rotation power between the planar nematic state and the focal conic state of the liquid crystal material is used, particularly for chiral nematic material having such a pitch length that infrared light is reflected.

The invention resides in each and every novel characteristic feature and each and every combination of characteristic features.

What is claimed is:

1. A light-modulating cell comprising two substrates with a layer of electro-optical material in between, comprising a chiral nematic liquid crystal material which, in co-operation with the substrates, can assume a plurality of states, of which at least a focal conic state and a twisted planar state are stable in the absence of an electric field, said light-modulating cell being also provided with drive means for applying an electric field, wherein the optical rotation of the layer of electro-optical material in the focal conic state and in the twisted planar state has different values and the different values determine switching between a substantially light transmissive state and a substantially light non-transmissive state.

2. A light-modulating cell as claimed in claim 1, characterized in that the difference of optical rotation is at least 20 degrees.

3. A light-modulating cell as claimed in claim 1, characterized in that the layer of electro-optical material is substantially transparent in the focal conic state, and a polarizer is present on at least one of the two sides of the light-modulating cell.

4. A light-modulating cell as claimed in claim 1, characterized in that the twisted planar structure has such a pitch length that light having a reflection band outside the visible part of the spectrum is reflected.

5. A light-modulating cell as claimed in claim 1, characterized in that the twisted planar structure has such a pitch length that light having a reflection band in the range above 500 nm is reflected.

6. A light-modulating cell as claimed in claim 5, characterized in that the twisted planar structure has such a pitch length that infrared light is reflected.

7. A light-modulating cell as claimed in claim 1, characterized in that the twisted planar structure for linearly polarized light has an optical rotation power with a value of between 20 and 180 degrees.

8. A light-modulating cell as claimed in claim 7, characterized in that the light-modulating cell is present between two polarizers whose directions of polarization have a mutual angle of between 30 and 140 degrees.

9. A light-modulating cell as claimed in claim 7, characterized in that at least one side of the light-modulating cell is provided with a transflector or a reflector.

10. A light-modulating cell as claimed in claim 1, characterized in that the light-modulating cell comprises at least a retarder.

11. A light-modulating cell as claimed in claim 1, characterized in that the light-modulating cell is present between a polarizer and a reflecting mirror.

12. A light-modulating cell as claimed in claim 1, characterized in that it has a thickness below 7 $\mu$m.

13. A light-modulating cell as claimed in claim 12, characterized in that it has a thickness below 4,5 $\mu$m.

14. A light-modulating cell as claimed in claim 1, characterized in that switching from the planar nematic state to the focal conic state occurs at a voltage $V_1$ of at most 18 V.

15. A light-modulating cell as claimed in claim 14, characterized in that $V_1$ is at most 9 V.

16. A light-modulating cell as claimed in claim 1, characterized in that switching from the planar nematic state to the homeotropic state occurs at a voltage $V_2$ of at most 32 V.

17. A light-modulating cell as claimed in claim 16, characterized in that $V_2$ is at most 20 V.

18. A light-modulating cell as claimed in claim 1, characterized in that switching from the focal-conic state to the homeotropic state occurs at a voltage $V_3$ of at most 15 V.

19. A light-modulating cell as claimed in claim 18, characterized in that $V_3$ is at most 10 V.

20. A display device provided with a light-modulating cell as claimed in claim 1.

\* \* \* \* \*